US008436095B2

(12) United States Patent
Chasser et al.

(10) Patent No.: US 8,436,095 B2
(45) Date of Patent: May 7, 2013

(54) POWDER COATING COMPOSITIONS, MID-GLOSS RANGE COATINGS, RELATED METHODS AND SUBSTRATES

(75) Inventors: Anthony M. Chasser, Allison Park, PA (US); Michael P. Makowski, Allison Park, PA (US); Brian E. Woodworth, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 1159 days.

(21) Appl. No.: 11/159,501

(22) Filed: Jun. 23, 2005

(65) Prior Publication Data

US 2006/0292374 A1      Dec. 28, 2006

(51) Int. Cl.
| | |
|---|---|
| *C08L 63/00* | (2006.01) |
| *C08F 8/00* | (2006.01) |
| *C08F 283/00* | (2006.01) |
| *B32B 27/38* | (2006.01) |

(52) U.S. Cl.
USPC ............ 525/107; 525/113; 525/523; 428/413

(58) Field of Classification Search .................. 525/113, 525/107, 523; 428/413
See application file for complete search history.

(56) References Cited

U.S. PATENT DOCUMENTS

| | | | | |
|---|---|---|---|---|
| 4,921,913 | A | 5/1990 | Pettit, Jr. ....................... | 525/119 |
| 5,491,204 | A * | 2/1996 | Nugent et al. ................ | 525/523 |
| 6,207,768 | B1 | 3/2001 | Sato et al. ..................... | 525/438 |
| 6,245,839 | B1 | 6/2001 | Jolley et al. ..................... | 524/86 |
| 6,291,581 | B1 * | 9/2001 | Bayards et al. ................ | 525/28 |
| 6,342,551 | B1 | 1/2002 | Jolley et al. .................. | 524/210 |
| 6,353,057 | B1 * | 3/2002 | He et al. ....................... | 525/124 |
| 6,395,828 | B1 | 5/2002 | Chang et al. .................... | 525/65 |
| 6,500,878 | B1 | 12/2002 | Reich et al. .................. | 522/100 |
| 6,531,524 | B2 | 3/2003 | Ring et al. .................... | 523/205 |
| 6,737,163 | B2 | 5/2004 | Chasser et al. ................ | 428/418 |
| 6,777,027 | B2 | 8/2004 | Daly et al. .................... | 427/180 |
| 6,825,258 | B2 | 11/2004 | Steckel ........................ | 524/308 |
| 6,849,687 | B2 | 2/2005 | Chang et al. .................... | 525/64 |
| 2002/0004557 | A1 | 1/2002 | Hart et al. ....................... | 525/80 |
| 2002/0173570 | A1 * | 11/2002 | Takeda et al. ................. | 524/315 |
| 2003/0121453 | A1 * | 7/2003 | Iwahashi et al. ............. | 106/502 |
| 2003/0148205 | A1 * | 8/2003 | Alexandrovich ........... | 430/111.4 |
| 2004/0024122 | A1 | 2/2004 | Chang et al. .................... | 525/64 |
| 2004/0067304 | A1 | 4/2004 | Daly et al. .................... | 427/180 |
| 2004/0068027 | A1 | 4/2004 | Daly et al. .................... | 522/111 |

FOREIGN PATENT DOCUMENTS

| | | |
|---|---|---|
| DE | 199 33 741 A1 | 1/2001 |
| EP | 539385 | 10/1995 |
| JP | 2001-2984 | 1/2001 |

OTHER PUBLICATIONS

Kawahara, Hideaki; Goto, Tokio; Ohnishi, Kiyoshi; Ogura, Hironao; Kage, Hiroyuki; Matsuno, Yoshizo. Journal of Applied Polymer Science, 81 (2001). "Preparation of Epoxy Resin/Acrylic Composite Latexes by Miniemulsion Polymerization Method" John Wiley & Sons, Inc. pp. 128-133.*
Encyclopedia Britannica Article. "Acid-Base Reaction".*
European Coatings Journal (2003), (7-8), pp. 21-22; 24-25, D. Beccaria et al, "Keep an eye on the acid value. Structure-property relations of incompatible resin blends for effective gloss control of polyester-β-hydroxyalkylamide powder coatings".
Progress in Organic Coatings, 46 (2003), pp. 266-272, Sang Sun Lee et al, "Gloss reduction in low temperature curable hybrid powder coatings".
German/English Translation of Pulver & Lack, No. 3, vol. 3, 1980, pp. 343-350, G. Dörmann et al, "Investigations on Flatting of Powder Coating Systems Containing Glycidyl Groups with Special Curing Agents".
German/English Translation of Farbe & Lack, vol. 108, No. 6, 2002, pp. 85-93, A. Skora et al, "Adjustment of Powder Coatings from Flat to Satin".
German/English Translation of Defazet, vol. 33, No. 2, 1979, pp. 46-50, F. Schülde et al, "Correlation of Surface Condition, Coating Properties and Crosslinking Mechanism of Powder Coatings".
Focus on Powder Coatings, Jul. 2002, p. 4-5, A. Skora et al, "Gloss Modification of Powder Coatings".
Polymers Paint Colour Journal, 191(4445), Oct. 2001, pp. 8-10, E. Dumain—"Tough Talk".
Polymers Paint Colour Journal, 188(4408), Sep. 1998, pp. 14-15, 18, D. S. Richart, "Surface topography of powder coatings and its relation to gloss".
European Coatings Journal, 2003, No. 10, 25, 4 pgs, L. T. Germinario et al, "A closer look at low gloss powder coatings".
Proc. PRA Third Asia-Pacific Conf., Singapore, Paper 26, 1993, 13 pgs. T. Kano, "Acrylic/polyester hybrid powder coating and morphology of coated film".
International Waterborne, High-Solids, and Powder Coatings Symposium, Mar. 1-3, 2000, New Orleans, LA, p. 337-349, C. Grob et al, "Gloss reduction of epoxy polyester powder coatings: a new versatile matting agent".

* cited by examiner

*Primary Examiner* — Mark Eashoo
*Assistant Examiner* — Megan McCulley

(57) ABSTRACT

Disclosed are curable powder coating compositions that include a film-forming resin composition that includes (a) a first film-forming resin, (b) a second film-forming resin that is different from and incompatible with the first film-forming resin, and (c) a compatibilizing agent that includes a first portion that is compatible with the first film-forming resin and a second portion that is compatible with the second film-forming resin. The compatibilizing agent is present in such compositions in an amount sufficient to result in a coating composition that, when deposited onto at least a portion of a substrate and cured, produces a mid-gloss coating.

17 Claims, No Drawings

POWDER COATING COMPOSITIONS, MID-GLOSS RANGE COATINGS, RELATED METHODS AND SUBSTRATES

FIELD OF THE INVENTION

The present invention relates to curable powder coating compositions. More particularly, the present invention is directed to curable powder coating compositions that comprise a film-forming resin composition comprising (a) a first film-forming resin, (b) a second film-forming resin that is different from and incompatible with the first film-forming resin, and (c) a compatibilizing agent comprising a first portion that is compatible with the first film-forming resin and a second portion that is compatible with the second film-forming resin.

BACKGROUND OF THE INVENTION

Powder coatings compositions for use in coating various types of substrates are often desired. Such coating compositions can greatly reduce, or even eliminate, the use of organic solvents that are often used in liquid coating compositions. When a powder coating composition is cured by heating, little if any volatile material is given off to the surrounding environment. This is a significant advantage over liquid coating compositions in which organic solvent is volatized into the surrounding atmosphere when the coating compositions is cured by heating.

In many applications, such as many outdoor applications, powder coating compositions that produce coatings having reduced gloss are desired. Low gloss coatings can be achieved by creating a surface that is rough on a microscopic scale, thus scattering incident light on the micro-structured surface, while retaining a smooth macroscopic appearance.

In liquid coating compositions, gloss reduction is often achieved by the use of pigment and/or filler particles in high volumes. While this approach is sometimes used in powder coating compositions, a large amount of fillers are often required to achieve a desired gloss level in powder coating applications due to the absence of film shrinkage during cure. As the amount of such fillers in powder coating compositions increases, a significant loss in mechanical properties of the cured coating often occurs. The difficulty in achieving low gloss coatings from powder coating compositions is exacerbated when low temperature cure (<300° F.) is required.

In some cases, low gloss coatings have been produced from powder coating compositions comprising incompatible components, such as film-forming resins that are incompatible with each other. One difficulty that has been experienced with this mechanism, however, is that it has been difficult, if not impossible, to achieve consistent stable gloss values from such coatings. Differences in oven temperature and reaction rates between the incompatible components can render the variation in gloss of the resultant coating difficult, if not impossible, to control. As a result, it has been difficult to produce stable mid-gloss range coatings from powder coating compositions.

Thus, it would be desirable to provide powder coating compositions that are capable of producing mid-gloss coatings. It would also be desirable to provide methods for producing mid-gloss coatings from powder coating compositions.

SUMMARY OF THE INVENTION

In certain respects, the present invention is directed to curable powder coating compositions. These powder coating compositions comprise a film-forming resin composition comprising: (a) a first film-forming resin, (b) a second film-forming resin that is different from and incompatible with the first film-forming resin, and (c) a compatibilizing agent comprising a first portion that is compatible with the first film-forming resin and a second portion that is compatible with the second film-forming resin. The compatibilizing agent is present in the composition in an amount sufficient to result in a coating composition that, when deposited onto at least a portion of a substrate and cured, produces a mid-gloss coating.

In other respects, the present invention is directed to methods for producing a low temperature curable powder coating composition suitable for producing mid-gloss coatings, wherein the composition comprises a film-forming resin composition comprising: (a) a first film-forming resin, and (b) a second film-forming resin that is incompatible with the first film-forming resin. These methods comprise including in the coating composition a compatibilizing agent comprising a first portion that is compatible with the first film-forming resin and a second portion compatible with the second film-forming resin, wherein the compatibilizing agent is present in the composition in an amount sufficient to result in a coating composition capable of producing a mid-gloss coating.

The present invention is also directed to substrates at least partially coated with a mid-gloss coating deposited from a curable powder coating composition comprising a film-forming resin composition comprising: (a) a first film-forming resin, (b) a second film-forming resin that is incompatible with the first film-forming resin, and (c) a compatibilizing agent comprising a first portion that is compatible with the first film-forming resin and a second portion that is compatible with the second film-forming resin.

DETAILED DESCRIPTION OF EMBODIMENTS OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. For example, and without limitation, this application refers to coating compositions that comprise "a compatibilizing agent". Such references to "a compatibilizing agent" is meant to encompass coating compositions comprising one compatibilizing agent as well as coating compositions that comprise more than one compatibilizing agent, such as coating compositions that comprise two different compatibilizing agents. In addition, in this application, the use of "or" means "and/or" unless specifically stated otherwise, even though "and/or" may be explicitly used in certain instances.

As previously indicated, in certain embodiments, the present invention is directed to curable powder coating compositions. As used herein, the term "curable" refers to compositions that have an initial powder state in which the composition can be conveniently applied to a surface, and a final state in which it has been transformed into a more continuous, coalesced state by chemical reaction, heat, or both. In certain embodiments, the chemical reaction involves a film-forming resin having reactive groups and a crosslinking monomer or oligomer, i.e. a curing agent. In certain embodiments, catalysts are employed to enable the crosslinking reaction to be carried out at lower temperatures. In certain embodiments, resin systems may be self-crosslinking, in which case a separate curing agent may not be necessary. As-used herein, "curable" is intended to also include those resin systems that are thermoplastically affixed onto a composite structure, in which case, "curing" would entail heating the resin to at least its deformation temperature, but without involving any essential chemical reactions.

In certain embodiments, the curable powder coating compositions of the present invention are curable at low temperatures, i.e., they are "low temperature cure" compositions. As used herein, the term "low temperature cure" compositions refers to compositions that cure at a temperature of 80° to 150° C., such as 80° to 125° C. In certain embodiments, therefore, the coating compositions of the present invention can be used on substrates that are not appropriately exposed to temperatures greater than 125° C. Examples of such materials include, but are not limited to, plastics, such as thermoset and thermoplastic compositions, and wood. Also suitable are articles of manufacture that include a variety of substrates, such as motors that contain both metal and rubber components.

As used herein, the term "powder coating composition" refers to coating compositions that are in the form of solid particulates, as opposed to coating compositions that are in a liquid form. Such compositions may have a small particle size (less than 10 micron) or may be of larger particle sizes, such as granules and other particulate matter. In certain embodiments, the powder coating compositions of the present invention are in the form of solid particulates having a particle size from 0.3 to 300 microns, such as 1 to 100 microns.

The powder coating compositions of the present invention comprise a film-forming resin composition. As used herein, the term "film-forming resin composition" is meant to include compositions that comprise polymers capable of forming a film (i.e., film-forming resins), curing agents (if any), and catalysts or accelerators (if any) that may be included to facilitate the reaction between the film-forming resin and the curing agent.

In certain embodiments, the film-forming resin compositions included within the coating compositions of the present invention comprise a first film-forming resin. In certain embodiments, the first film-forming resin comprises an acid group containing acrylic resin. As used herein, the term "acid group containing acrylic resin" is meant to include acrylic resins that include at least two carboxylic acid groups. In certain embodiments, such resins are formed by reacting a polymerizable $\alpha,\beta$-ethylenically unsaturated carboxylic acid with another $\alpha,\beta$-ethylenically unsaturated monomer, such as a vinyl monomer, such as vinyl aromatic monomers and esters of $\alpha,\beta$-ethylenically unsaturated carboxylic acids. Non-limiting examples of suitable carboxylic acid group-containing monomers, vinyl aromatic compounds, and esters of $\alpha,\beta$-ethylenically unsaturated acids, and their respective amounts are disclosed in U.S. Pat. No. 4,921,913 at col. 2, lines 33 to 68, the cited portion of which being incorporated herein by reference. Other monomers suitable for use in preparing such resins and procedures suitable for use in preparing such resins are disclosed in U.S. Pat. No. 4,921,913 at col. 3, lines 1 to 38, the cited portion of which being incorporated herein by reference.

In certain embodiments, the acid group containing acrylic resin included within the coating compositions of the present invention has a number average molecular weight of 1500 to 40,000, such as 2000 to 40,000, as determined by gel permeation chromatography (GPC) using a polystyrene standard. In certain embodiments, the acid group containing acrylic resin included within the coating compositions of the present invention has a glass transition temperature (Tg) of from 40° C. to 150° C., such as 50° C. to 80° C., as measured using Differential Scanning Calorimetry (DSC) (rate of heating 10° C. per minute, Tg taken at the first inflection point).

In certain embodiments, the first film-forming resin is present in the coating composition in an amount of 1 to 30 percent by weight, such as 4 to 10 percent by weight, based on the total weight of resin solids in the composition.

In certain embodiments, the coating compositions of the present invention comprise a second film-forming resin that is different from and incompatible with the first film-forming resin. As used herein, when it is stated that the "second film-forming resin is incompatible with the first film-forming resin" it means that the free energy of mixing ($\Delta G$, wherein $\Delta G = \Delta H - T\Delta S$, where G is the Gibb's free energy, H is enthalpy, S is entropy, and T is temperature) of the first and second film-forming resins is a positive value.

In certain embodiments, the thermodynamic interaction parameter, sometimes referred to herein as "$\chi$", of the first film-forming resin and the second film-forming resin is at least 0.5. As will be understood by those skilled in the art, the thermodynamic interaction parameter is a dimensionless value that characterizes the interaction energy between a polymer molecule and a solvent or another polymer molecule. (Flory, Principles of Polymer Chemistry, Cornell University Press (1953) at pp. 507-511 and 541-545). The thermodynamic interaction parameter can be measured directly by small angle neutron scattering (Lohse, Polymer Preprints, (2001), 42(1), p. 259).

In addition, the thermodynamic interaction parameter, $\chi$, between materials is sometimes defined with reference to the difference in solubility parameter, $\delta$, of the materials, according to the following equation:

$$\chi = V_m(\delta_1 - \delta_2)^2 / RT$$

where $\delta$ refers to the Hildebrand solubility parameter (which sometimes is referred to as the cohesion parameter in polymeric systems). There are various ways of determining the solubility parameters for polymeric systems. For example, a solubility parameter can be assigned for a polymeric system by a group additivity method, such as Van Krevelen ("VK") and Fedors, as is described in "Prediction of Polymer Properties", 3d ed., Bicerano (2002) Marcel Dekker, Inc., N.Y., the relevant portions of which being incorporated herein by reference. The solubility parameter values reported herein are determined by such a method and are referred to herein as a "VK solubility parameter" and a "Fedors solubility parameter", respectively. Solubility parameters are expressed in the square root of Joules per cubic centimeter ($(J/cm^3)^{1/2}$). In certain embodiments, the difference between the solubility parameter (either VK or Fedors), $\delta_1$ of the first film-forming resin and the solubility parameter (either VK or Fedors), $\delta_2$, of the second film-forming resin ($\delta_1-\delta_2$) is at least 1, such as at least 1.5, or, in some cases at least 2.

In certain embodiments, the second film-forming resin comprises a polyepoxy resin. As used herein, the term "polyepoxy resin" refers to resins that include at least two epoxy groups per molecule, such as those that contain at least two 1,2-epoxide groups per molecule. In certain embodiments, the epoxy equivalent weight of such resins ranges from 180 to 4000 based on solids of the polyepoxide resin, such as between 500 and 1000. The polyepoxide resin may be saturated or unsaturated, and may be aliphatic, alicyclic, aromatic, or heterocyclic. They may contain substituents such as halogens, hydroxyl groups, and ether groups.

Suitable classes of polyepoxide resins include, without limitation, epoxy ethers obtained by reacting an epihalohydrin, such as epichlorohydrin with a polyphenol in the presence of an alkali. Suitable polyphenols include, without limitation, resorcinol, catechol, hydroquinone, bis(4-hydroxyphenyl)-2,2-propane (Bisphenol A), bis(4-hydroxyphenyl)-1,1-isobutane, bis(4-hydroxyphenyl)-1,1-ethane, bis(2-hydroxyphenyl)-methane, 4,4-dihydroxybenzophenone, and 1,5-dihydroxynaphthalene.

Other suitable polyepoxide resins include polyglycidyl ethers of polyhydric alcohols. These compounds may be derived from polyhydric alcohols, such as, for example, ethylene glycol, propylene glycol, butylene glycol, 1,6-hexylene glycol, neopentyl glycol, diethylene glycol, glycerol, trimethylol propane, and pentaerythritol. These compounds may also be derived from polymeric polyols, such as polypropylene glycol.

Examples of other suitable polyepoxide resins include polyglycidyl esters of polycarboxylic acids. These compounds may be formed by reacting epichlorohydrin or another epoxy material with an aliphatic or aromatic polycarboxylic acid, such as, for example, succinic acid, adipic acid, azelaic acid, sebacic acid, maleic acid, 2,6-naphthalene dicarboxylic acid, fumaric acid, phthalic acid, tetrahydrophthalic acid, hexahydrophthalic acid, and/or trimellitic acid. Dimerized unsaturated fatty acids containing about 36 carbon atoms (Dimer Acid) and polymeric polycarboxylic acids, such as carboxyl terminated acrylonitrile-butadiene rubber may also be used in the formation of these polyglycidyl esters of polycarboxylic acids.

Polyepoxide resins derived from the epoxidation of an olefinically unsaturated alicyclic compound are also suitable for use in the coating compositions of the present invention. These polyepoxide resins are nonphenolic and are obtained by epoxidation of alicyclic olefins with, for example, oxygen, perbenzoic acid, acid-aldehyde monoperacetate, or peracetic acid. Such polyepoxide resins include the epoxy alicyclic ethers and esters known in the art.

Other suitable polyepoxide resins include epoxy novolac resins, which are obtained by reacting an epihalohydrin with the condensation product of aldehyde and monohydric or polyhydric phenols. A typical example is the reaction product of epichlorohydrin with a phenol-formaldehyde condensate.

The coating compositions of the present invention may contain one polyepoxide resin or mixtures of two or more different polyepoxide resins.

In certain embodiments, the second film-forming resin comprises an epoxy-polyester hybrid resin. In such embodiments, the epoxy component of the hybrid can be, for example, a bisphenol A based epoxy resin having an epoxy equivalent weight of, for example, 730 to 820, such as a "type 3-3.5" resin having on average 3-3.5 hydroxyl-substituted propoxy bisphenol A units (n=3-3.5 on average in structure below):

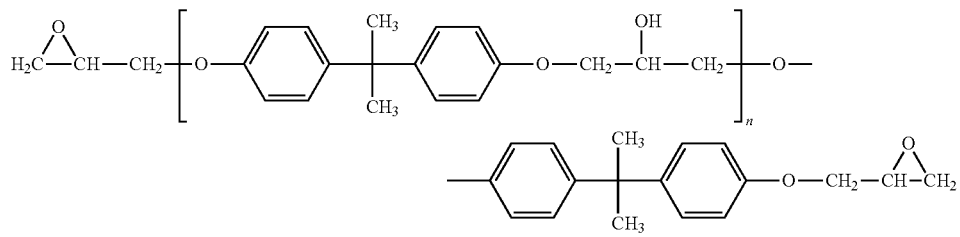

This epoxy resin is available from Dow Chemical Company under the name "D.E.R.® 663U". The polyester resin in this epoxy-polyester hybrid is believed to be a saturated carboxylated (i.e. carboxy-functionalized) polyester resin, having an acid number of 70 to 85, and a glass transition temperature of 56° C. This polyester resin is available from DSM Resins BV under the name "URALAC® P 5127". The curing reaction for this epoxy-polyester hybrid is believed to involve epoxy-carboxyl reactions, where the carboxyl terminated polyester cures the epoxy resin. The reaction between an epoxy group and a carboxylic acid group proceeds readily at elevated temperatures, producing ester and hydroxy functionalities. This reaction sometimes utilizes a suitable catalyst, such as, for example benzyltrimethylammonium chloride and 2-methylimadazole.

In certain embodiments, the second film-forming resin that is different from and incompatible with the first film-forming resin is present in the coating composition in an amount of 50 to 99 percent by weight, such as 70 to 96 percent by weight, based on the total weight of resin solids in the composition.

In certain embodiments, the film-forming resin compositions included in the coating compositions of the present invention also comprise a compatibilizing agent. The precise material utilized as the compatibilizing agent is not critical, in certain embodiments of the present invention, so long as the material comprises a first portion that is compatible with the first film-forming resin and a second portion that is compatible with the second film-forming resin. As used herein, when it is stated that a portion of the compatibilizing agent is "compatible" with a film-forming resin contained in the coating composition, it means that the free energy of mixing (ΔG, as described earlier) of a portion of the compatibilizing agent and the film-forming resin to which it is being compared is a negative value. In certain embodiments, the thermodynamic interaction parameter, "χ", of the portion of the compatibilizing agent and the film-forming resin being discussed is less than 0.5. In certain embodiments, the difference between the solubility parameter (either VK or Fedors), $\delta_a$, of the portion of the compatibilizing agent being discussed and the solubility parameter (either VK or Fedors), $\delta_b$, of the film-forming resin to which it is being compared ($\delta_a-\delta_b$) is less than 2, such as less than 1.5.

In certain embodiments, such as when the first film-forming resin comprises an acid group containing acrylic resin, as described earlier, and the second film-forming resin comprises a polyepoxy resin and/or an epoxy-polyester hybrid resin, as described earlier, the compatibilizing agent may comprise an epoxy amine adduct. Such adducts may be formed by capping, i.e., reacting the epoxy end groups of a polyepoxy resin, such as the polyepoxy resins described earlier, with a ketimine, secondary amine and/or primary amine.

Ketimines are formed by reacting ketones with primary amines. Water formed in the reaction is removed, for example, by azeotropic distillation. Useful ketones include, for example, dialkyl, diaryl, and alkylaryl ketones having 3-13 carbon atoms. Specific examples of ketones that may be used to form these ketimines include, for example, acetone, methyl ethyl ketone, methyl n-butyl ketone, methyl isobutyl ketone, methyl isoamyl ketone, methyl aryl ketone, ethyl isoamyl ketone, ethyl amyl ketone, acetophenone, and benzophenone. Suitable diamines include, for example, ethylene diamine, 1,3-diaminopropane, 1,4-diaminobutane, 1,6-diaminohexane, 4,9-dioxadodecane and 1,12-diamine and the like. One typically useful ketimine is diketimine which is the ketimine of diethylene triamine and methyl isobutyl ketone.

Useful primary and secondary amines that can be used to form the epoxy-amine adduct include, for example, methyl amine, ethyl amine, propyl amine, butyl amine, isobutyl amine, benzyl amine and the like; and dimethyl amine, diethyl amine, dipropyl amine, diisopropyl amine, dibutyl amine and the like. Alkanol amines may also be used, such as ethanol amine, methanol amine, propanol amine, and the like; and methyl ethanol amine, ethyl ethanol amine, phenyl ethanol amine, diethanol amine and the like. Amines that can be used include those set forth in U.S. Pat. No. 4,419,467 at col. 4, line 43 to col. 5, line 15, the cited portion of which being incorporated herein by reference.

In certain embodiments, such as when the first film-forming resin comprises an acid group containing acrylic resin, as described earlier, and the second film-forming resin comprises a polyepoxy resin and/or an epoxy-polyester hybrid resin, as described earlier, the compatibilizing agent may comprise a monocarboxylic acid, such as a fatty acid and/or fatty alcohol ester. Suitable fatty acids include materials having the formula:

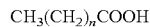

wherein n represents an integer having a value ranging from 4 to 30, or, in some cases, 14 to 22. These fatty acids can be saturated or unsaturated and can be straight chained or branched. Also included are diacids, triacids, and other multiple acids. Also suitable are salts of these fatty acids. Non-limiting examples of suitable fatty acids include, without limitation, caproic acid, caprylic acid, 2-ethyl hexanoic acid, capric acid, lauric acid, isotridecanoic acid, myristic acid, palmitic acid, palmitoleic acid, stearic acid, isostearic acid, oleic acid, elaidic acid, petroselic acid, linoleic acid, linolenic acid, elaeostearic acid, arachic acid, gadoleic acid, behenic acid and erucic acid.

In certain embodiments, the compatibilizing agent is present in the composition in an amount sufficient to result in a coating composition that, when deposited onto at least a portion of a substrate and cured, produces a mid-gloss coating. As used herein, the term "mid-gloss coating" refers to a coating that has a 60° gloss, measured as described below, of from 10 to 80, such as 20 to 70, 20 to 60, or, in some cases, 30 to 60, gloss units. In certain embodiments, the coating compositions of the present invention, when deposited onto at least a portion of a substrate at a thickness of up to 20 mils and cured, produce a mid-gloss coating.

As used herein, the term "gloss" refers to the ability of a coating to reflect light, with a higher gloss value corresponding to a larger amount of light being reflected. As will be understood by those skilled in the art, gloss measurements can be made using a BYK/Haze Gloss meter available from Gardner Instrument Company, Inc. As used herein, the term "60° gloss" refers to the gloss of a coated substrate determined at a 60° angle using such a BYK/Haze Gloss meter.

In certain embodiments, the film-forming resin compositions included in the coating compositions of the present invention also comprise a curing agent comprising a material having reactive groups reactive with the reactive group(s) of the first and/or second film-forming resins. As used herein, the term "curing agent" refers to a material that promotes cure of film-forming resins.

Any of a variety of curing agents known to those skilled in the art may be used. For example, polyepoxides as curing agents for carboxylic acid reactive group containing materials are well known in the art and are suitable for use in the powder coating compositions of the present invention. Examples of suitable polyepoxide curing agents include those described in U.S. Pat. No. 4,681,811 at col. 5, lines 33 to 58, hereby incorporated by reference. Polyacids as curing agents for epoxy reactive group containing materials are well known in the art and are suitable for use in the powder coating compositions of the present invention. Examples of suitable polyacids include those described in U.S. Pat. No. 4,681,811 at col. 6, line 45 to col. 9, line 54, hereby incorporated by reference. When desired, appropriate mixtures of curing agents may be used.

In certain embodiments, the curing agent is present in the coating composition in an amount of 1 to 50 percent by weight, such as 5 to 20 percent by weight, based on the total weight of resin solids in the composition.

In certain embodiments, however, the coating compositions of the present invention are substantially free, or, in some cases, completely free of curing agent. As used herein, the term "substantially free" means that the material is present in the composition, if at all, as an incidental impurity. In other words, the material does not effect the properties of the composition. As used herein, the term "completely free" means that the material is not present in the composition at all.

In certain embodiments, the film-forming resin compositions included in the coating compositions of the present invention also comprise a catalyst or accelerator to increase the rate of reaction between a film-forming resin and a curing agent. The catalyst employed depends on the film-forming resins and curing agents employed. Typical catalysts include tin catalysts, imidazoles, cyclic amidine, alkyl/aryl ammonium halides, and zinc alkyl/aryl thiocarbamates. In certain embodiments, the catalyst comprises a tertiary aminourea compound, a tertiary aminourethane compound, or a mixture thereof, such as the materials described in U.S. Pat. No. 6,737,163 at col. 3, line 3 to col. 4, lines 55, the cited portion of which being incorporated herein by reference.

In certain embodiments, the catalyst is present in the coating composition in an amount of 0.5 to 10 percent by weight, such as 3 to 5 percent by weight, based on the total weight of the composition.

In certain embodiments, the coating compositions of the present invention also contain other additives, such as waxes for flow and wetting, flow control agents, such as poly(2-ethylhexyl) acrylate, degassing additives, such as benzoin and MicroWax C, adjuvant resins to modify and optimize coating properties, antioxidants and UV light absorbers, such as those available commercially from Ciba-Geigy under the trademarks IRGANOX® and TINUVIN®. These optional additives, when used, are often present in amounts up to 20 weight percent, based on the total weight of the coating composition, and, if used, will often comprise 1 to 5 weight percent, based on the total weight of the coating composition.

In addition, any of various pigments standardly used in the powder coatings art can also be included. In some cases, pigment weight can be up to 80 percent of the weight of the entire coating composition and often is around 35 weight percent of the coating composition.

The coating compositions of the present invention can further comprise a plurality of particles, such as organic or inorganic particles, or mixtures thereof, that may contribute to the mar and/or scratch resistance of the coatings. Such particles are described in United States Patent Application Publication No. 20020137872 at [0022] to [0038], the cited portion of which being incorporated herein by reference.

The coating compositions of the present invention can be prepared by standard methods known in the art. For example, the components may be first thoroughly mixed to ensure spatial homogeneity of the ingredients. The composition may then be intimately melt kneaded in an extruder. Common zone temperatures during extrusion range from 40° C. to 125° C., such as 45° C. to 100° C. The exiting extrudate may then be rapidly cooled to minimize polymerization. The resulting chip can then be micronized into powder with an average particle size of 0.1 to 300 microns, such as 1 to 100 microns. Comminution can be accomplished, for example, by air-classifying mills, impact mills, ball mills, or other fracture-induced mechanisms. Post additives that improve fluidization of the powder mass and/or improve the resistance to impact fusion may be incorporated into the final product before or after micronization.

The powder coating compositions of the present invention can be applied to a substrate in any number of ways, most often by electrostatic spraying. The powder coating can be applied in a single sweep or in several passes to provide a film having a thickness after cure of from about 1 to 10 mils (25 to 250 microns), usually about 2 to 4 mils (50 to 100 microns). Other standard methods for coating application can also be employed.

After application, the present compositions may be cured by heating to a temperature of 80° C. to 150° C., such as 80° C. to 125° C., for a period ranging from 3 minutes to 30 minutes, such as 15 to 20 minutes. Heating can be effected by any means known in the art, typically by placing the coated substrate in an oven. IR radiation can also be used to heat cure the coated substrates.

Accordingly, the present invention is further directed to methods for coating a substrate comprising applying to the substrate one or more of the coating compositions described herein and curing the coating composition. A number of substrates are suitable for coating according to the methods of the present invention, including plastics, such as thermosets or thermoplastics, cardboard, paper, wood, metal, particleboard and medium density fiberboard or mixtures thereof. Substrates coated according to the present methods are also within the scope of the present invention.

The present invention is also directed to methods for producing a low temperature cure powder coating composition suitable for producing mid-gloss coatings, wherein the composition comprises a film-forming resin composition comprising: (a) a first film-forming resin, and (b) a second film-forming resin that is incompatible with the first film-forming resin. These methods comprise including in the coating composition a compatibilizing agent comprising a first portion that is compatible with the first film-forming resin and a second portion compatible with the second film-forming resin, wherein the compatibilizing agent is present in the composition in an amount sufficient to result in a coating composition capable of producing a mid-gloss coating.

The present invention is also directed substrates at least partially coated with a mid-gloss coating deposited from a curable powder coating composition comprising a film-forming resin composition comprising: (a) a first film-forming resin, (b) a second film-forming resin that is incompatible with the first film-forming resin, and (c) a compatibilizing agent comprising a first portion that is compatible with the first film-forming resin and a second portion that is compatible with the second film-forming resin.

Illustrating the invention are the following examples, which, however, are not to be considered as limiting the invention to their details. Unless otherwise indicated, all parts and percentages in the following examples, as well as throughout the specification, are by weight.

EXAMPLES

Example 1

Preparation of Epoxy Amine Adduct

An epoxy amine adduct was prepared in a glass reaction vessel equipped with an addition funnel, mechanical agitation and a nitrogen blanket. 1600 parts by weight of Epon 2002 (an epoxy resin available from Resolution Performance Products and having a VK solubility parameter of 22.22 $(J/cm^3)^{1/2}$ (Fedors solubility parameter of 21.92 $(J/cm^3)^{1/2}$) was added to the reaction vessel and heated to 155° C. 154 parts by weight of N-methyl ethanolamine having a VK solubility parameter of 19.22 (Fedors solubility parameter of 19.43 $(J/cm^3)^{1/2}$) was charged to the addition funnel, and the material in the addition funnel was added to the reaction vessel dropwise over 1 hour. The reaction temperature reached 164° C. at the end of the addition and the reaction was agitated for an additional hour with the temperature maintained at 150° C. The deep yellow reaction product was poured out to a metal pan to cool and solidify. The final product was broken up into flakes. The final product was analyzed by titration and the epoxy equivalent weight was determined to be 1681 grams/equivalent.

The final product had a structure of formula (III) depicted below comprising a head group portion and two tail group portions, wherein the head group portion of formula (I) had a VK solubility parameter of 22.22 $(J/cm^3)^{1/2}$ (Fedors solubility parameter of 21.92 $(J/cm^3)^{1/2}$) and the tail portions of formula (II) had a VK solubility parameter of 19.22 (Fedors solubility parameter of 19.43 $(J/cm^3)^{1/2}$)

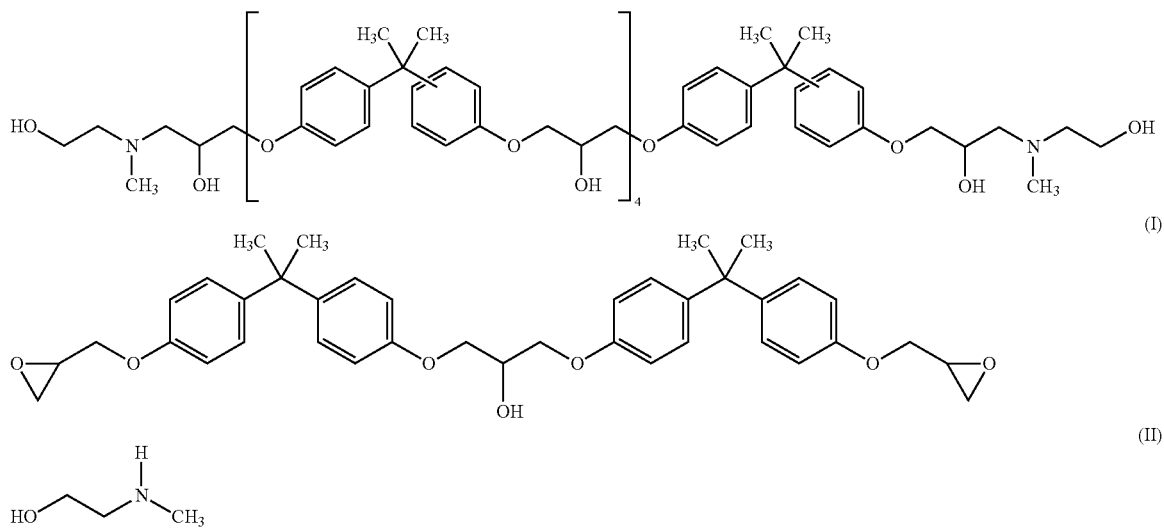

Example 2

Preparation of Coating Compositions

Compositions A to P were prepared using the components and amounts (parts by weight in grams) shown in Table 1. The coatings were prepared by premixing the ingredients in a three-blade mixer rotating at 3500 rpm. The premix was then extruded in a 19 mm dual screw extruder operating at a temperature of 80° C. The extrudate was rapidly cooled and pressed into chip. The chip was micronized to an average particle size of 35 microns using a Hosokawa Air-Classifying Mill (ACM). The coatings were sprayed onto Bonderite 1000 steel panels and cured at 137.8° C. for 20 minutes. Gloss of the resultant coatings was measured at a 60° angle using a BYK/Haze Gloss meter available from Gardner Instrument Company, Inc. Results are set forth in Table 2.

TABLE 1

| Material | Composition | | | | | |
|---|---|---|---|---|---|---|
| | A | B | C | D | E | |
| Epon 1001F[1] | 208.3 | 208.3 | 208.3 | 208.3 | 208.3 | |
| Epon 2002[2] | 208.3 | 208.3 | 208.3 | 208.3 | 208.3 | |
| EpiKure P201[3] | 39.9 | 39.9 | 39.9 | 39.9 | 39.9 | |
| Tertiary Amine Urea Catalyst | 16.3 | 16.3 | 16.3 | 16.3 | 16.3 | |
| Thixcin R[4] | 9.4 | 9.4 | 9.4 | 9.4 | 9.4 | |
| Benzoin | 4.1 | 4.1 | 4.1 | 4.1 | 4.1 | |
| Resiflow PL-200A[5] | 8.1 | 8.1 | 8.1 | 8.1 | 8.1 | |
| Regal 660[6] | 8.1 | 8.1 | 8.1 | 8.1 | 8.1 | |
| Tiona 595[7] | — | — | — | — | — | |
| Barytes W-10[8] | 203.5 | 203.5 | 203.5 | 203.5 | 203.5 | |
| Adduct of Example 1 | — | 25.0 | 35.0 | 45.0 | 55.0 | |
| Acrylic Resin Composition[9] | 40.0 | 40.0 | 40.0 | 40.0 | 40.0 | |

| Material | Composition | | | | | |
|---|---|---|---|---|---|---|
| | F | G | H | I | J | K |
| Epon 1001F[1] | 208.3 | 208.3 | 208.3 | 208.3 | 208.3 | 208.3 |
| Epon 2002[2] | 208.3 | 208.3 | 208.3 | 208.3 | 208.3 | 208.3 |
| EpiKure P201[3] | 39.9 | 39.9 | 39.9 | 39.9 | 39.9 | 39.9 |
| Tertiary Amine Urea Catalyst | 16.3 | 16.3 | 16.3 | 16.3 | 16.3 | 16.3 |
| Thixcin R[4] | 9.4 | 9.4 | 9.4 | 9.4 | 9.4 | 9.4 |
| Benzoin | 4.1 | 4.1 | 4.1 | 4.1 | 4.1 | 4.1 |
| Resiflow PL200A[5] | 8.1 | 8.1 | 8.1 | 8.1 | 8.1 | 8.1 |
| Regal 660[6] | 8.1 | 8.1 | 8.1 | 8.1 | 8.1 | 8.1 |
| Tiona 595[7] | — | — | — | — | — | — |
| Barytes W-10[8] | 203.5 | 203.5 | 203.5 | 203.5 | 203.5 | 203.5 |
| Adduct of Example 1 | — | 20.0 | 25.0 | 30.0 | 35.0 | 40.0 |
| Acrylic Resin Composition[9] | 49.5 | 49.5 | 49.5 | 49.5 | 49.5 | 49.5 |

| Material | Composition | | | | |
|---|---|---|---|---|---|
| | L | M | N | O | P |
| Epon 1001F[1] | 185.5 | 185.5 | 185.5 | 185.5 | 185.5 |
| Epon 2002[2] | 185.5 | 185.5 | 185.5 | 185.5 | 185.5 |
| EpiKure P201[3] | 30.0 | 30.0 | 30.0 | 30.0 | 30.0 |
| Tertiary Amine Urea Catalyst | 20.0 | 20.0 | 20.0 | 20.0 | 20.0 |
| Thixcin R[4] | 9.4 | 9.4 | 9.4 | 9.4 | 9.4 |
| Benzoin | 3.0 | 3.0 | 3.0 | 3.0 | 3.0 |
| Resiflow PL-200A[5] | 8.1 | 8.1 | 8.1 | 8.1 | 8.1 |
| Regal 660[6] | — | — | — | — | — |
| Tiona 595[7] | 210.0 | 210.0 | 210.0- | 210.0 | 210.0 |
| Barytes W-10[8] | — | — | — | — | — |
| Adduct of Example 1 | — | 30.0 | 40.0 | 50.0 | 60.0 |
| Acrylic Resin Composition[9] | 40.0 | 40.0 | 40.0 | 40.0 | 40.0 |

[1]Epoxy resin commercially available from Resolution Performance Products and having a VK solubility parameter of 22.22 (J/cm³)^(1/2) (Fedors solubility parameter of 21.92 (J/cm³)^(1/2)).
[2]Epoxy Resin commercially available from Resolution Performance Products and having a VK solubility parameter of 22.22 (J/cm³)^(1/2) (Fedors solubility parameter of 21.92 (J/cm³)^(1/2)).
[3]Phenolic curing agent available from Resolution Performance Products.
[4]Flow additive available from Rhodia.
[5]Available from Solutia, Inc.
[6]Carbon black pigment available from Cabot Corp.
[7]Titanium dioxide pigment available from Millenium Chemicals, Hunt Valley, MD.
[8]Barium sulphate.
[9]Prepared by mixing 85 parts of Joncryl 843 (a carboxyl functional acrylic resin having an acid number of 204 and a VK solubility parameter of 18.93 (J/cm³)^(1/2) (Fedors solubility parameter of 20.59 (J/cm³)^(1/2)) available from S. C. Johnson & Sons, Racine, Wis.) and 15 parts Thixcin R (corrosion inhibitor available from Elementis) in a three blade mixer rotating at 3500 rpm. The mixture was extruded in a 19 mm dual screw extruder operating at a temperature of 110° C.. The extrudate was rapidly cooled and pressed into chip.

TABLE 2

| Composition | 60° Gloss | | |
| --- | --- | --- | --- |
| | Initial | After 1 week at 32° C. | After 3 weeks at room temperature |
| A | 13 | — | — |
| B | 35 | — | — |
| C | 46 | — | — |
| D | 54 | — | — |
| E | 61 | — | — |
| F | 10 | — | — |
| G | 19 | — | — |
| H | 20 | — | — |
| I | 23 | — | — |
| J | 29 | — | — |
| K | 32 | — | — |
| L | 16 | — | 16 |
| M | 43 | 55 | 45 |
| N | 58 | 68 | 60 |
| O | 70 | 74 | 73 |
| P | 82 | 71 | 80 |

Whereas particular embodiments of this invention have been described above for purposes of illustration, it will be evident to those skilled in the art that numerous variations of the details of the present invention may be made without departing from the invention as defined in the appended claims.

We claim:

1. A curable powder coating composition comprising a film-forming resin composition comprising:
   (a) a first film-forming resin, wherein the first film-forming resin comprises an acid group containing acrylic resin,
   (b) a second film-forming resin that is different from and incompatible with the first film-forming resin, wherein the second film-forming resin is selected from a polyepoxy resin, an epoxy-polyester hybrid resin, or a mixture thereof, and
   (c) a compatibilizing agent comprising a fatty alcohol ester, wherein the compatibilizing agent is present in the composition in an amount sufficient to result in a coating composition that, when deposited onto at least a portion of a substrate and cured, produces a mid-gloss coating having a 60° gloss of from 10-80 gloss units.

2. The coating composition of claim 1, wherein the composition is a low temperature cure composition.

3. The coating composition of claim 1, wherein the acid group containing acrylic resin of the first film-forming resin has a number average molecular weight of 1500 to 20,000.

4. The coating composition of claim 1, wherein the first film-forming resin is present in the coating composition in an amount of 1 to 30 percent by weight, based on the total weight of resin solids in the composition.

5. The coating composition of claim 1, wherein the difference between the solubility parameter of the first film-forming resin and the solubility parameter of the second film-forming resin is at least 1 $(J/cm^3)^{1/2}$.

6. The coating composition of claim 1, wherein the second film-forming resin is present in the coating composition in an amount of 70 to 96 percent by weight, based on the total weight of resin solids in the composition.

7. A method for at least partially coating a substrate comprising applying to the substrate the coating composition of claim 1 and curing the coating composition.

8. A substrate at least partially coated by the method of claim 7.

9. The coating composition of claim 1, wherein the mid-gloss coating has a 60° gloss of from 20 to 70 gloss units.

10. The coating composition of claim 1, wherein the compatibilizing agent further comprises an epoxy amine adduct.

11. A substrate at least partially coated with a mid-gloss coating deposited from a curable powder coating composition comprising a film-forming resin composition comprising: (a) a first film-forming resin, wherein the first film-forming resin comprises an acid group containing acrylic resin, (b) a second film-forming resin that is incompatible with the first film-forming resin and is selected from a polyepoxy resin, an epoxy-polyester hybrid resin, or a mixture thereof, and (c) a compatibilizing agent comprising a fatty alcohol ester, wherein the mid-gloss coating has a 60° gloss of from 10-80 gloss units.

12. The substrate of claim 11, wherein the difference between the solubility parameter of the first film-forming resin and the solubility parameters of the second film-forming resin is at least 1 $(J/cm^3)^{1/2}$.

13. The substrate of claim 11, wherein the compatibilizing agent further comprises an epoxy amine adduct.

14. The substrate of claim 13, wherein the mid-gloss coating has a 60° gloss of from 20 to 70 gloss units.

15. A curable powder coating composition comprising a film-forming resin composition comprising:
   (a) a first film-forming resin, wherein the first film-forming resin comprises an acid group containing acrylic resin,
   (b) a second film-forming resin that is different from and incompatible with the first film-forming resin, wherein the second film-forming resin is selected from a polyepoxy resin, an epoxy-polyester hybrid resin, or a mixture thereof, and
   (c) a compatibilizing agent comprising an epoxy amine adduct and a fatty alcohol ester, wherein the compatibilizing agent is present in the composition in an amount sufficient to result in a coating composition that, when deposited onto at least a portion of a substrate and cured, produces a mid-gloss coating having a 60° gloss of from 20 to 70 gloss units.

16. A curable powder coating composition comprising a film-forming resin composition comprising:
   (a) a first film-forming resin, wherein the first film-forming resin comprises an acid group containing acrylic resin,
   (b) a second film-forming resin that is different from and incompatible with the first film-forming resin, wherein the second film-forming resin is selected from a polyepoxy resin, an epoxy-polyester hybrid resin, or a mixture thereof, and
   (c) a compatabilizing agent comprising a fatty alcohol ester, an epoxy amine adduct derived from an alkanol amine, or a mixture thereof, wherein the compatibilizing agent is present in the composition in an amount sufficient to result in a coating composition that, when deposited onto at least a portion of a substrate and cured, produces a mid-gloss coating having a 60° gloss of from 10-80 gloss units.

17. The coating composition of claim 16, wherein the compatabilizing agent comprises a fatty alcohol ester and an epoxy amine adduct derived from an alkanol amine.

* * * * *